US007073072B1

(12) United States Patent
Salle

(10) Patent No.: US 7,073,072 B1
(45) Date of Patent: Jul. 4, 2006

(54) METHOD TO PREVENT POWER DISSIPATION ATTACKS ON A CRYPTOGRAPHIC ALGORITHM BY IMPLEMENTING A RANDOM TRANSFORMATION STEP

(75) Inventor: Patrick Salle, Verrieres Le Buisson (FR)

(73) Assignee: Axalto SA, Meudon Cedex (FR)

( * ) Notice: Subject to any disclaimer, the term of this patent is extended or adjusted under 35 U.S.C. 154(b) by 0 days.

(21) Appl. No.: 09/646,640

(22) PCT Filed: Mar. 17, 1999

(86) PCT No.: PCT/FR99/00613

§ 371 (c)(1),
(2), (4) Date: Nov. 9, 2000

(87) PCT Pub. No.: WO99/48239

PCT Pub. Date: Sep. 23, 1999

(30) Foreign Application Priority Data

Mar. 17, 1998 (FR) .................................. 98 03242

(51) Int. Cl.
  *G06F 12/14* (2006.01)
  *G06F 11/30* (2006.01)
(52) U.S. Cl. ...................... 713/193; 713/192; 713/194; 380/28; 380/29
(58) Field of Classification Search .................. 380/28, 380/29, 30; 713/192–194
See application file for complete search history.

(56) References Cited

U.S. PATENT DOCUMENTS

| 5,623,548 | A * | 4/1997 | Akiyama et al. ............. 380/28 |
| 5,991,415 | A * | 11/1999 | Shamir ........................ 380/30 |
| 6,049,613 | A * | 4/2000 | Jakobsson .................... 380/47 |
| 6,064,740 | A * | 5/2000 | Curiger et al. ............. 380/265 |
| 6,327,661 | B1 * | 12/2001 | Kocher et al. ............. 713/193 |
| 6,381,699 | B1 | 4/2002 | Kocher |
| 6,986,054 | B1 * | 1/2006 | Kaminaga et al. .......... 713/193 |

FOREIGN PATENT DOCUMENTS

EP      0981223 A2 *   2/2000

OTHER PUBLICATIONS

Schneier, Bruce; Applied Cryptography; 1996; John Wiley & Sons, Inc.; 2$^{nd}$ Edition; pp. 1-18, 265-301, 357-368, 561-595.*

(Continued)

*Primary Examiner*—Gilberto Barron, Jr.
*Assistant Examiner*—Jung Kim
(74) *Attorney, Agent, or Firm*—Pehr Jansson

(57) ABSTRACT

A data protection method using a cryptographic algorithm comprising at least one execution cycle of repetitive operations for processing data elements (K2, R1) so as to generate encrypted information (C). At least one step (120, 220) is provided for randomly modifying the execution of at least one operation from one cycle to another, or at least one of the data elements, so that the encrypted information is unchanged by this random modification.

4 Claims, 3 Drawing Sheets

OTHER PUBLICATIONS

Kocher, Paul; "Timing Attacks on Implementations of Diffie-Hellman, RSA, DSS, and Other Systems"; 1995; Cryptography Reasearch, Inc.; pp. 1-10.*

Colberg et al.; "A Taxonomy of Obfuscation Transformations"; Technical Report #148, Department of Computer Science, The University of Auckland; Jul. 1997; pp. 1-9.*

FIPS Publication 46-2; "Announcing the Standard for Data Encryption Standard"; National Bureau of Standards; Jan. 22, 1988; pp. 1-16.*

"Timing attacks on implementations of Diffie-Hellman, RSA, DSS and other systems", P.C. Rocher, Advances in Cryptology, Crypto'96. 16$^{th}$ Annual Int'l. Cryptology Conference Proceedings, Santa Barbara, CA, USA, Aug. 18-22, 1996, pp. 104-113.

"Data Encryption Standard (DES)", Federal Information Processing Standards Publication 46-2, Dec. 30, 1993, National Bureau of Standards.

* cited by examiner

METHOD TO PREVENT POWER DISSIPATION ATTACKS ON A CRYPTOGRAPHIC ALGORITHM BY IMPLEMENTING A RANDOM TRANSFORMATION STEP

FIELD OF THE INVENTION

The present invention relates to a data protection method, for example designed to be implemented by the microprocessor of a bank card or an access authorization card during a connection to an authenticating computer terminal.

BACKGROUND OF THE INVENTION

The known types of data protection methods use a cryptographic algorithm comprising execution cycles of repetitive operations for processing data elements contained in a memory of the card so as to generate encrypted information intended to be communicated to the computer terminal.

The execution of the method by the microprocessor of the card results in the sending of derivative signals such as peaks in the level of the microprocessor's electric power consumption, or variations in the electromagnetic radiation such that the envelope of electromagnetic radiation is indicative of the data processed. An attacker seeking to use the microprocessor cards in an unauthorized way can trigger the execution of the method repeatedly and analyze the derivative signals emitted in order to determine correspondences between the various processing operations and each signal or series of signals. From these correspondences, and for example by subjecting the card to electromagnetic disturbances or voltage drops at precise moments in the execution of the algorithm, the attacker can study the encrypted information obtained and the differences, or lack of differences, between the derivative signals emitted, in order to discover the data contained in the memory of the card.

To complicate this type of analysis of the derivative signals, it has been suggested that parasitic signals be generated and added to the derivative signals emitted during the execution of the method. The extraction of the signals that correspond to the execution of the method is then more difficult, but it is still possible. It has also been suggested that the electronic components of the card and the program for executing the method be designed so that the derivative signals emitted are independent of the value of the sensitive data. However, this complicates the production of the cards without providing satisfactory protection of the data.

SUMMARY OF THE INVENTION

One object of the invention is to offer an effective protection method that does not have the aforementioned disadvantages.

In order to achieve this object, the invention provides a data protection method using a cryptographic algorithm for executing operations for processing data elements so as to generate encrypted information, this method comprising at least one step for the random transformation of the execution of at least one operation from one cycle to another, or for the random transformation of at least one of the data elements, so that the encrypted information is unchanged by this random transformation.

Random transformation of the execution of at least one operation is intended to mean a modification of the order of execution of operations or parts of operations, or a modification of the execution of a single operation. Thus, at least one operation and/or at least one of the pieces of data processed is randomly modified, which randomly affects the derivative signals emitted. This makes it very difficult for an attacker to distinguish between the various processing operations and to discover the data from the derivative signals. Moreover, the random modification does not affect the encrypted information, so it can be used in the normal way after it is generated.

BRIEF DESCRIPTION OF THE DRAWING

Other characteristics and advantages of the invention will emerge through the reading of the following description of a particular non-limiting embodiment of the invention, in connection with the attached figures 1–5, illustrating in the form of a block diagram, different permutations therein of the execution of methods according to embodiments, and an exemplary hardware embodiment of the invention.

DETAILED DESCRIPTION OF THE DRAWING

Figure 1:
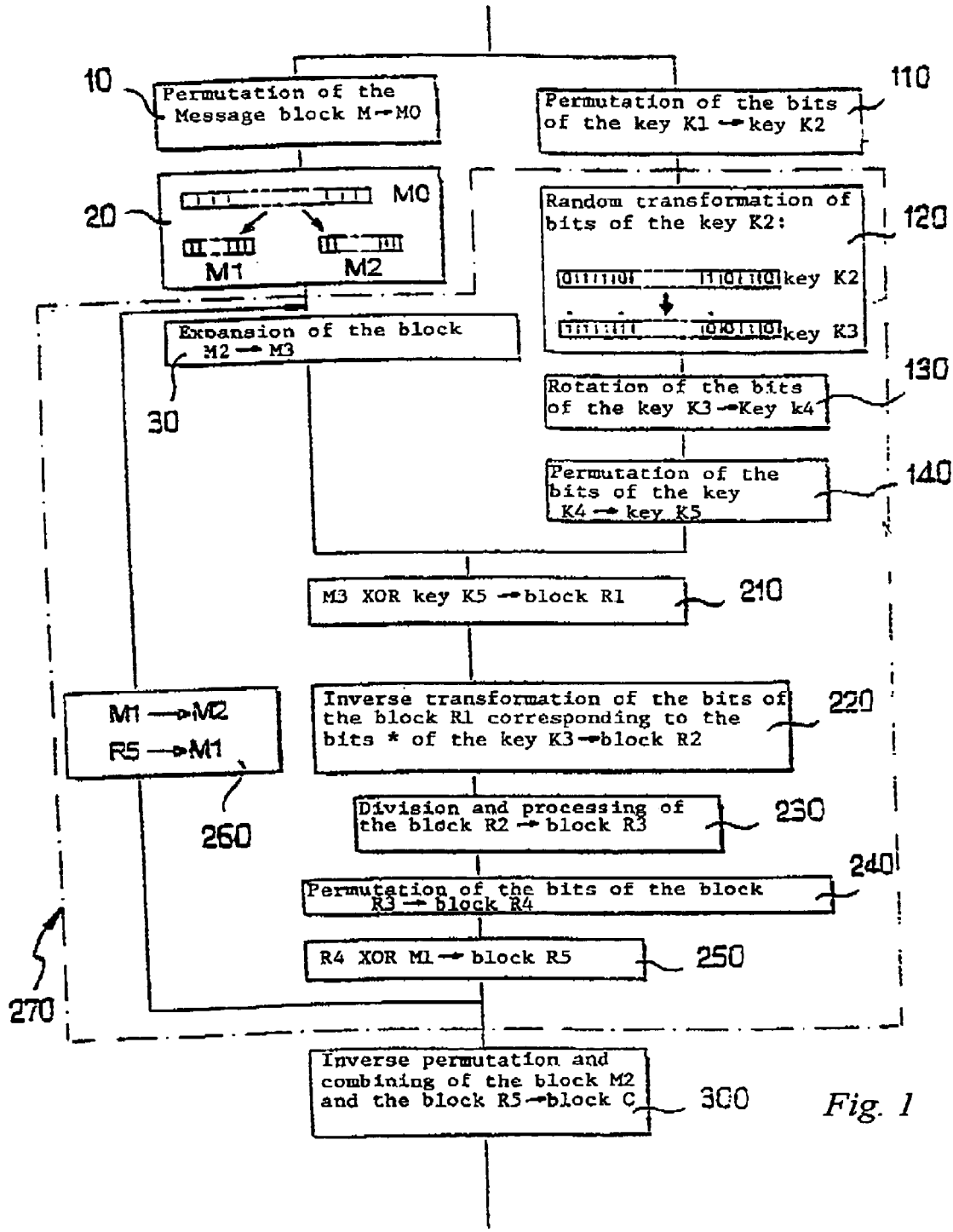

The protection method according to the invention described herein uses a symmetric cryptographic algorithm of the DES (DATA ENCRYPTION STANDARD) type to generate 64-bit encrypted information C from a message block M and a secret key K1, both 64-bit. A description of the algorithms used in DES is presented in the document Federal Information Processing Standards Publication 46-2, Dec. 30, 1993 issued by the National Bureau of Standards, and its content is hereby incorporated by reference.

The method begins with the permutation 10 of the bits of the message block M with one another, in order to form the block M0.

The block M0 is then divided into two 32-bit blocks M1 and M2 during a division step 20.

It then performs the expansion 30 of the block M2 to form a 48-bit block M3. This expansion 30 is performed, for example, by partitioning the block M2 into eight quartets, and by adding to each quartet the adjacent end bit of the quartets framing the quartet in question (the end quartets being considered to be adjacent).

In parallel with these operations, a permutation 110 is performed on the bits of the key K1 to form the key K2. The insignificant bits of the key K1 are simultaneously deleted so that the key K2 has only 56 bits.

According to the invention, the bits of the key K2 are then randomly modified during a transformation 120. The bits of the key K3 corresponding to the modified bits of the key K2, here marked with a star, are stored. The transformation 120 is for example performed by associating with the key K2, by means of a logical operator of the exclusive-OR type, a random number generated by an unpredictable number generator of the card.

A key K4 is obtained through the rotation 130 of the bits of the key K3. Then, a permutation 140 is performed on the bits of the key K4 to form the key K5. Simultaneously with the permutation 140, the insignificant bits of the key K4 are eliminated so that the key K5 comprises 48 bits.

The method continues with the association 210 of the block M3 and the key K5 by means of a logic operator of the exclusive—OR type. The result of this association is the block R1.

The inverse transformation of the bits of the block R1 corresponding to the bits modified by the transformation 120 is then performed in order to form the block R2. The purpose of this inverse transformation 220 of the transformation 120 is to return the bits of the block R1 corresponding to the bits marked with a star to the state in which they would have been without the transformation 120.

The method then continues, in a conventional way, with the division and the processing 230 of the block R2, the permutation 240 of the bits of the block R3 formed in step 230, and the association 250 of the block R4 resulting from step 240 with the block M1 by means of an exclusive-OR operator, in order to form the block R5.

The group of operations designated overall by the reference 270 is then re-executed five times assigning, with each execution, the value of the block M1 to the block M2 and the value of the block R5 to the block M1 during an assignment step 260.

The method ends with the operation 300 for obtaining the encrypted information C through the inverse permutation and the combining of the last block M2 and the last block R5 obtained.

It is understood that the step for randomly modifying the key K2 comprises the transformation phase 120 and the inverse transformation phase 220. These two phases make it possible to obtain encrypted information C that is not affected by this random modification.

It would also be possible, in the same way, to perform a random modification of the block M2 and/or of another piece of data.

According to another embodiment of the invention, which can be associated with a modification step like the one described above, the execution of at least one operation can be randomly modified from one cycle to another, a cycle being a complete execution cycle of the algorithm or an intermediate execution cycle of a group of operations.

For example, a random determination of the order of execution of certain operations can be made during an execution cycle of the algorithm. The operations retained are the ones whose order of execution relative to the others does not affect the result. To make this determination, it is possible to perform, at the end of the chosen operations, a conditional jump to certain operations as a function of the value of a random number or to define a table of the addresses of the various operations, scanned randomly.

For example, the permutation 10 of the bits of the message block M could be performed after the permutation 110 of the bits of the key K1, or vice versa.

Likewise, it is possible to provide for a random determination of the order of execution of the operations of the group 270 for each intermediate execution cycle of the latter (16 intermediate execution cycles of these operations for one complete execution cycle of the algorithm). Here again, the order of execution of these operations is chosen so as not to affect the result.

Furthermore, for certain operations, the data are processed in elements. Thus, during the expansion 30, the blocks M2 are processed in quartets. During this operation, it is possible to provide for a random determination of the processing order of the various quartets. Likewise, during the permutation 140, the bits of the key K4 are processed individually. A step for randomly determining the processing order of the bits can also be provided for the execution of this permutation. The quartets of the block M2 can also be processed alternately with the bits of the key K4, meaning for example that a first quartet of the block M2 is processed, followed by a bit string of the key K4, followed by a second quartet of the block M2, etc., each time storing the data elements processed in order to verify that all of the required operations are actually executed.

Of course, the invention is not limited to the embodiment just described, but on the contrary encompasses any variant that retains, with equivalent means, its essential characteristics.

In particular, although the invention has been described in connection with an algorithm of the DES type, the invention can be applied to other symmetric algorithms that work by modifying bits. Thus, the modification being performed by means of a logical operator of the exclusive-OR type, the length of the non-transformed data elements is identical to the length of these data elements transformed.

Furthermore, the numbers of bits of the data are only mentioned as an example and can be modified in order to be adapted to the degree of protection sought.

It will also be noted that all of the data elements M, M0, M1, M2, M3, K1, K2, K3, K4, K5, R1, R2, R3, R4 and R5 can be transformed by associating a random number with them, by means of the exclusive-OR logical operator, bearing in mind that after this random transformation step, an inverse transformation step is performed so that the encrypted information C is unchanged by said transformations.

In particular, the data elements can be keys K1, K2, K3, K4, K5 or message blocks M, M0, M1, M2, M3, or message blocks associated with a key by a logical operator of the exclusive-OR type R1, R2, R3, R4, R5.

Figure 2:
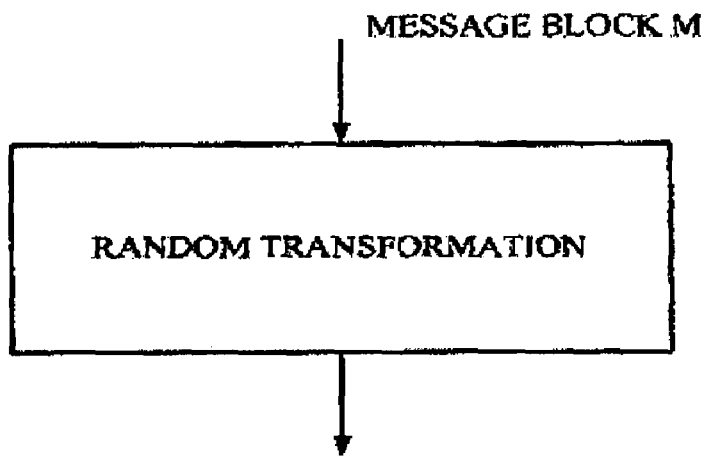
Figure 3:
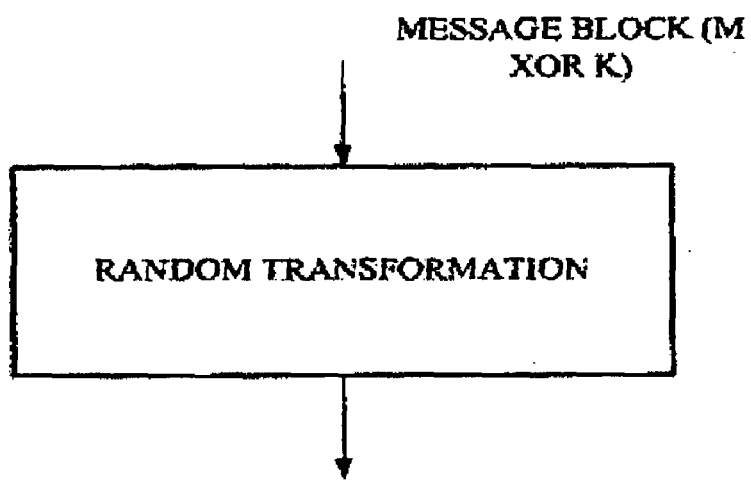

FIG. 2 is a block diagram illustrating an alternative embodiment in which the randomly transformed data element is a message block. FIG. 3 is a block diagram illustrating an alternative embodiment in which the randomly transformed data element is a message block associated with a key by logical operator of the exclusive-OR type.

Finally, it will be noted that if the random transformation step is a step that precedes the group of operations executed repeatedly, and if the inverse transformation step is a step that follows said group of operations, generating a random number once and processing the message block M with the algorithm is enough to obtain the encrypted information, all the data elements of the block being modified. The data string is protected from end to end. Moreover, by not multiplying the transformation steps and the number of random numbers generated, the algorithm is executed quickly, which is necessary in the case of a chip card, in which the execution time of an algorithm should be minimal.

Figure 4:
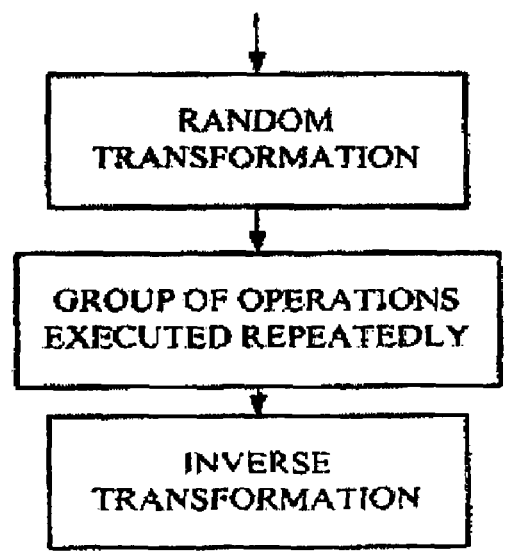

FIG. 4 is a block diagram illustrating an embodiment in which the random transformation step is a step that precedes the group of operations (270) executed repeatedly and in which the inverse transformation step follow the group of repeated operations (270).

Figure 5:
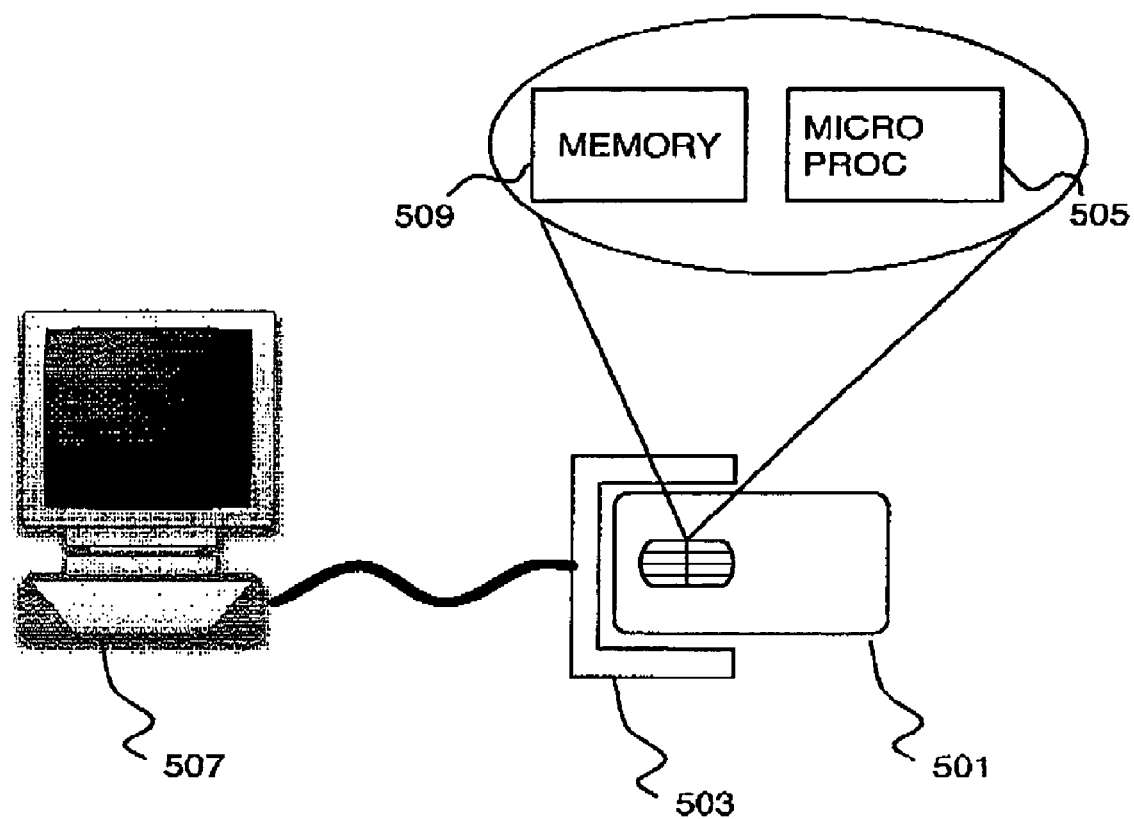

FIG. 5 is a schematic illustration showing a microprocessor 505 of a chip card 501, for example, a bank card or access authorization card connected to an authenticating computer terminal 507. The data protection method of the present invention is, for example, designed to be implemented on a microprocessor 505 of a chip card 501 during a connection to an authenticating terminal 507. The chip card 501 also contains a memory 509 having therein some data, for example, keys, which is protected by the method of the present invention.

The invention claimed is:

1. Data protection method for operating a microprocessor of a chip card to protect data elements contained in a memory of a chip card from discovery by analysis of electrical power consumption by the microprocessor, said method using a cryptographic algorithm for executing operations for processing said data elements so as to generate encrypted information, said method comprising:

operating the microprocessor to randomly modifying the order of execution of operations involving manipulations of data elements contained in the memory from one cycle to another, a cycle being a complete execution cycle of the algorithm or an intermediate cycle of a group of operations, said operations being operations whose order of execution relative to the others does not affect the result, thereby protecting said data elements contained in said memory and processed by a microprocessor in a chip card from discovery by analysis of the microprocessor's electric power consumption.

2. The protection method according to claim 1, wherein the modified order of execution of operations include permutation of bits of a message block which is performed after the permutation of bits of a key, and vice versa.

3. The protection method according to claim 1, wherein the modified order of execution of operations include a random determination of the processing of quartets.

4. The data protection method of claim 1 wherein said data elements are keys.

* * * * *